(12) United States Patent
Pan et al.

(10) Patent No.: US 8,775,970 B2
(45) Date of Patent: Jul. 8, 2014

(54) METHOD AND SYSTEM FOR SELECTING A BUTTON IN A BLU-RAY DISC JAVA MENU

(75) Inventors: Shan-Chun Pan, Miaoli County (TW); Yu Chung Lee, New Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 68 days.

(21) Appl. No.: 13/191,776

(22) Filed: Jul. 27, 2011

(65) Prior Publication Data

US 2013/0031510 A1 Jan. 31, 2013

(51) Int. Cl.
*G06F 3/00* (2006.01)
*G06F 3/048* (2013.01)
*G06F 3/0482* (2013.01)
*G06F 3/0484* (2013.01)
*G06F 3/0488* (2013.01)
*G06F 3/0487* (2013.01)
*G06F 3/038* (2013.01)

(52) U.S. Cl.
CPC ............ *G06F 3/0487* (2013.01); *G06F 3/0482* (2013.01); *G06F 3/04842* (2013.01); *G06F 3/0488* (2013.01); *G06F 3/038* (2013.01)
USPC ........... 715/823; 715/821; 715/716; 715/840; 715/856

(58) Field of Classification Search
None
See application file for complete search history.

(56) References Cited

U.S. PATENT DOCUMENTS

| 6,252,596 | B1 * | 6/2001 | Garland ........................ 715/810 |
| 6,388,657 | B1 * | 5/2002 | Natoli ........................... 345/168 |
| 7,793,218 | B2   | 9/2010 | Tsai et al. |
| 2002/0130844 | A1 * | 9/2002 | Natoli ........................... 345/168 |
| 2006/0132447 | A1 * | 6/2006 | Conrad ......................... 345/168 |
| 2007/0140667 | A1 * | 6/2007 | Uchimura ..................... 386/125 |
| 2009/0007024 | A1 * | 1/2009 | Yang ............................. 715/862 |
| 2009/0031254 | A1 * | 1/2009 | Herpel et al. ................. 715/840 |
| 2010/0005392 | A1   | 1/2010 | Wang |
| 2011/0157196 | A1 * | 6/2011 | Nave et al. .................... 345/522 |

OTHER PUBLICATIONS

Chang, Tsung-Hsiang et al., Apr. 2010, GUI Testing Using Computer Vision.*
Saesoft International, 1992, Mouse Control Simulator and Mouse Test Controller—v2.0.*

* cited by examiner

*Primary Examiner* — Matt Kim
*Assistant Examiner* — Mahelet Shiberou
(74) *Attorney, Agent, or Firm* — McClure, Qualey & Rodack, LLP

(57) ABSTRACT

In one embodiment, a button mapping method comprising comparing an image difference between images before and after a keyboard event, the images including a first and second version of buttons in a menu, respectively; constructing by the processor a button map based on the comparison, the button map comprising button information for at least two buttons in the menu; receiving one or more selection signals corresponding to one or more non-keyboard events; and translating the one or more selection signals into one or more keyboard events based on the button map, wherein the button in the menu is selected based on the translation.

19 Claims, 8 Drawing Sheets

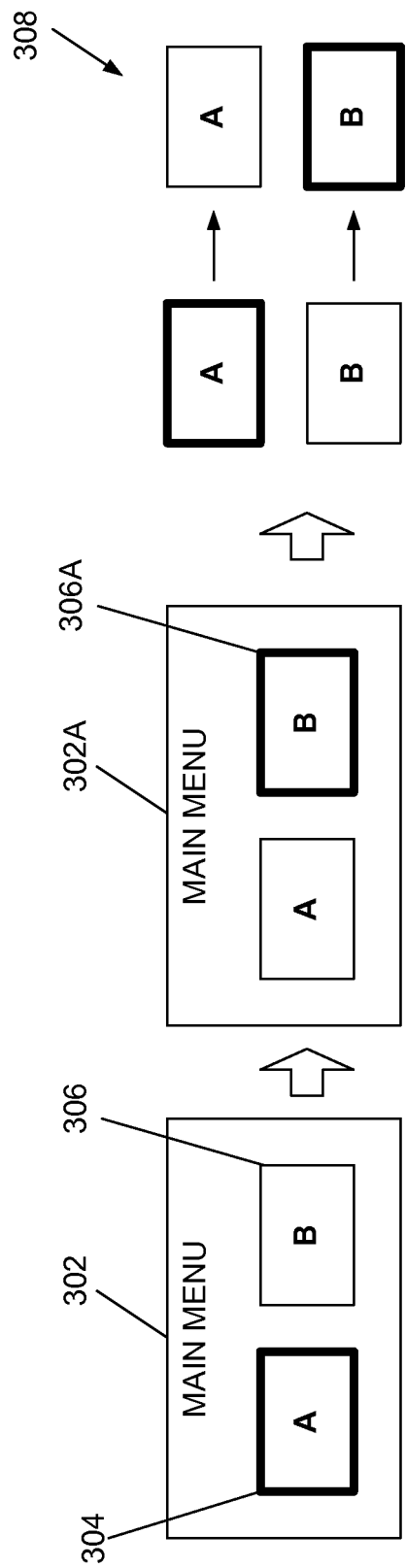

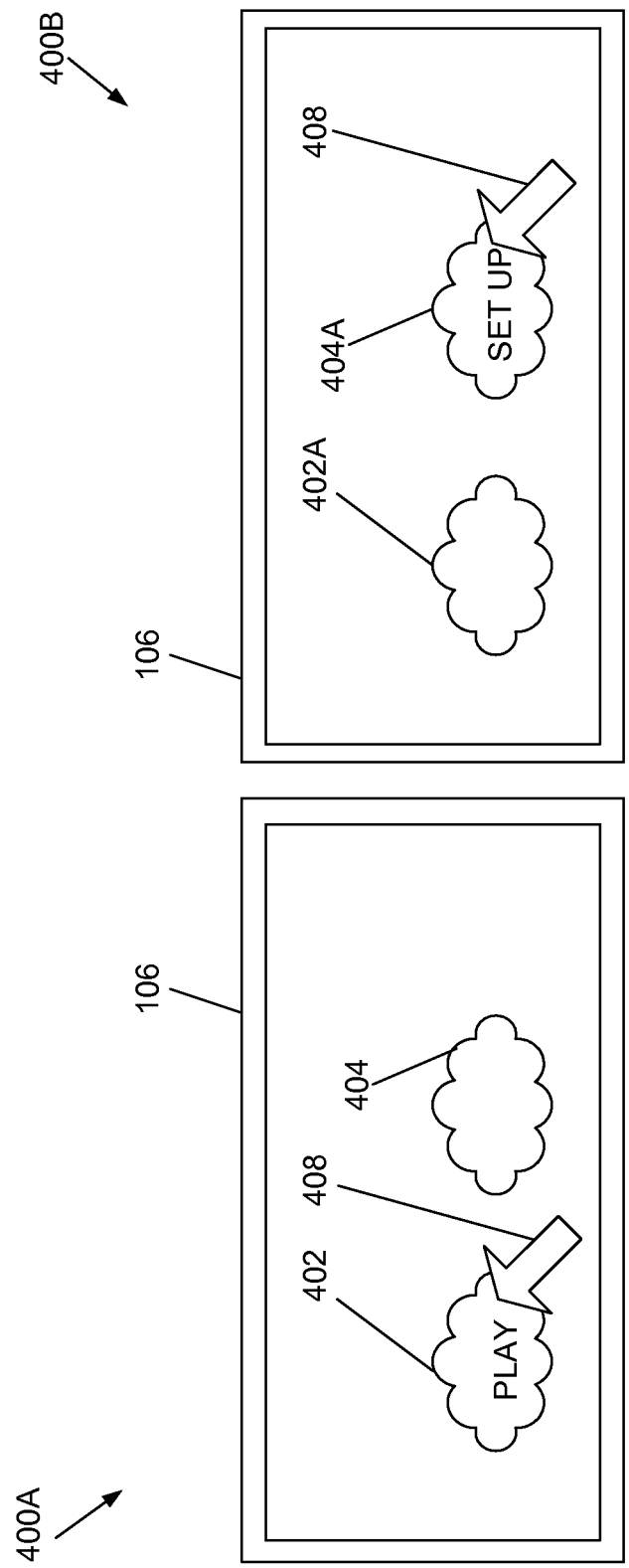

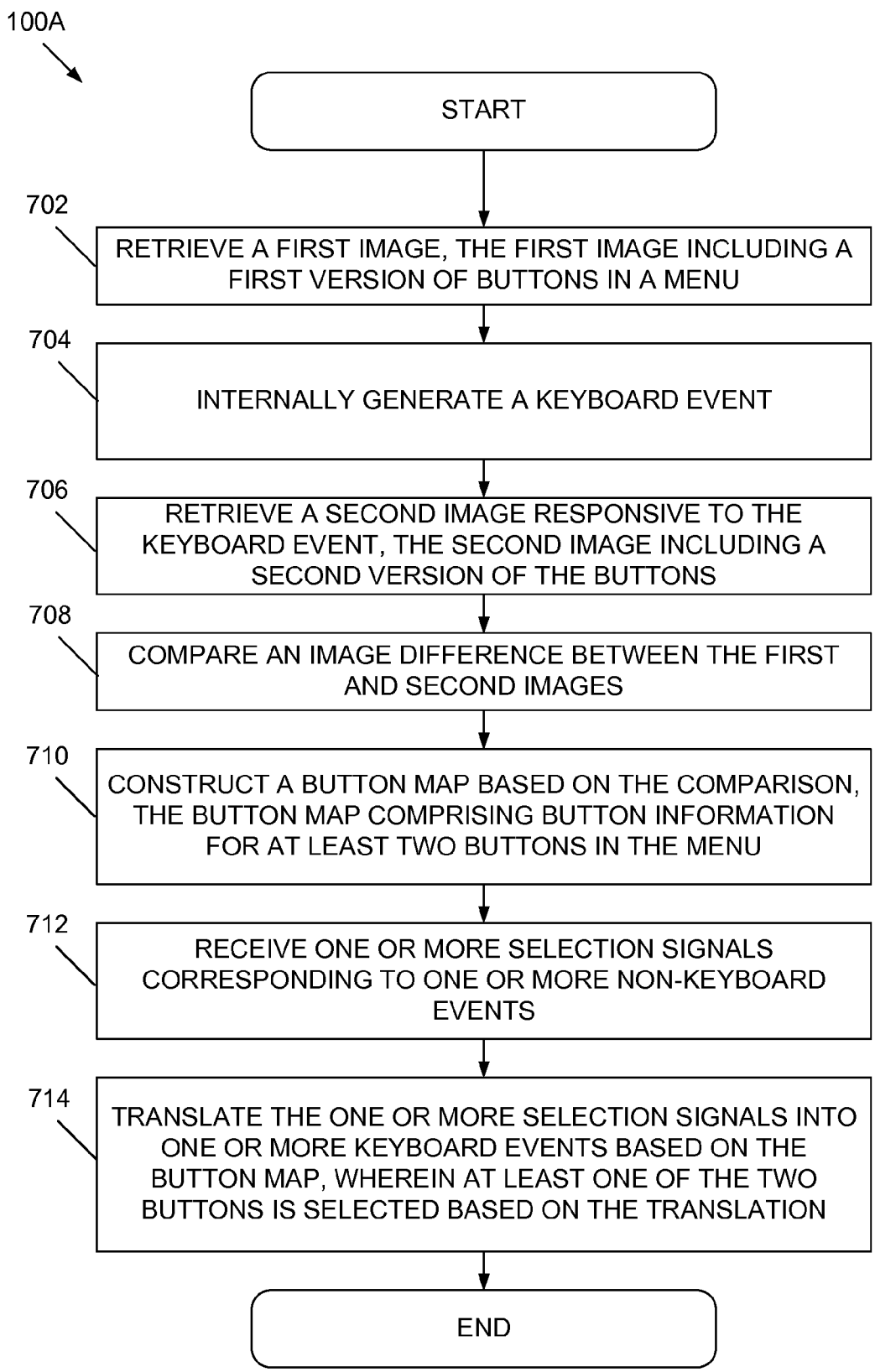

METHOD AND SYSTEM FOR SELECTING A BUTTON IN A BLU-RAY DISC JAVA MENU

TECHNICAL FIELD

The present disclosure generally relates to user interfaces in a Blu-ray Disc (BD) video playback system.

BACKGROUND

There are a variety of standards governing the format and/or other attributes of high definition video. Blu-ray Disc (BD) is a popular optical disc storage media format that is employed for high definition video and data storage. Blu-ray Disc Java (BD-J) is a development platform that allows content authors to create and incorporate interactive functionality into a Blu-ray Disc. For example, a content author can incorporate in a user interactive program on a Blu-ray Disc various user interactive menus, games, and other functionality that can be supported by the BD-J specification. A content author may also choose to support various user input devices, such as a keyboard, but not all user input devices may be supported, often resulting in user dissatisfaction.

SUMMARY

In one embodiment, a button mapping method that includes retrieving a first image, the first image including a first version of buttons in a menu; internally generating a keyboard event; retrieving a second image responsive to the keyboard event, the second image including a second version of the buttons; comparing an image difference between the first and second images; constructing a button map based on the comparison, the button map comprising button information for at least two buttons in the menu; receiving one or more selection signals corresponding to one or more non-keyboard events; and translating the one or more selection signals into one or more keyboard events based on the button map, wherein at least one of the two buttons is selected based on the translation.

In another embodiment, a button mapping system comprising a memory comprising disc viewer logic encoded thereon; and a processor configured to: compare an image difference between images before and after a keyboard event, the images including a first and second version of buttons in a menu, respectively; construct a button map based on the comparison, the button map comprising button information for at least two buttons in the menu; receive one or more selection signals corresponding to one or more non-keyboard events; and translate the one or more selection signals into one or more keyboard events based on the button map, wherein the button in the menu is selected based on the translation.

In another embodiment, a button mapping method implemented by a processor, the method comprising comparing an image difference between images before and after a keyboard event, the images including a first and second version of buttons in a menu, respectively; constructing by the processor a button map based on the comparison, the button map comprising button information for at least two buttons in the menu; receiving one or more selection signals corresponding to one or more non-keyboard events; and translating the one or more selection signals into one or more keyboard events based on the button map, wherein the button in the menu is selected based on the translation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A-3C are functional flow diagrams that depict an embodiment of a method for generating a button map.

FIGS. 4A-4B are example menu screens illustrating an embodiment of a method for detecting button information.

FIG. 7 is a flow diagram of an embodiment of a button mapping method implemented in a BD video playback system.

DETAILED DESCRIPTION

Figure 1:
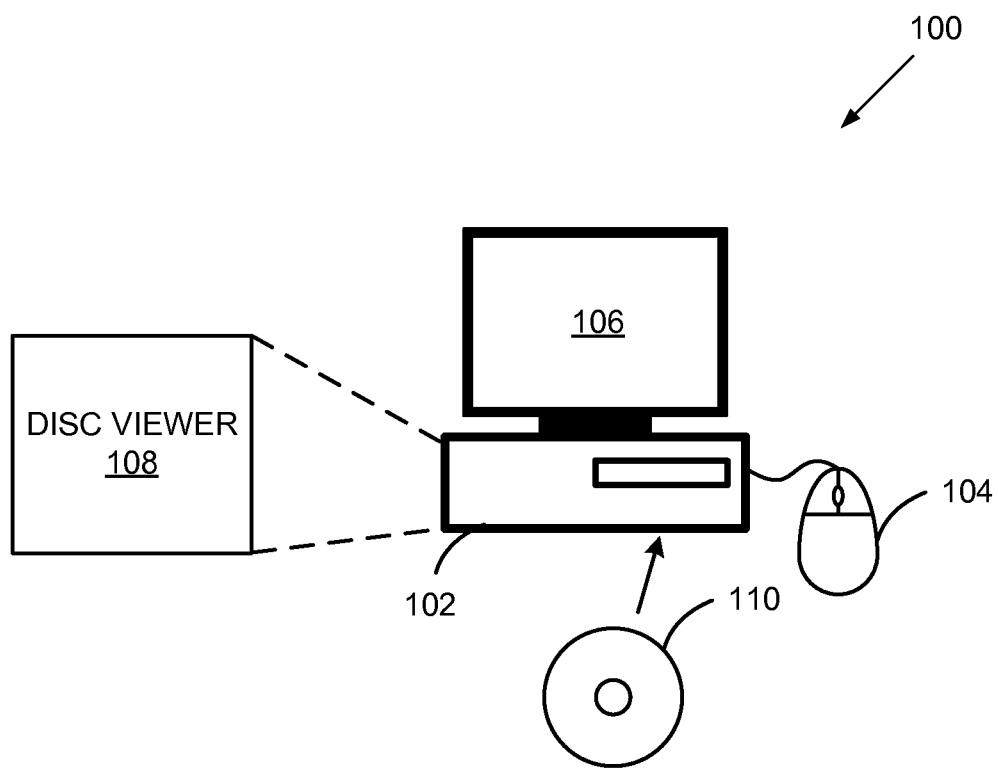
FIG. 1 is a block diagram of an example embodiment of a Blu-ray Disc (BD) video playback system comprising a video playback apparatus that supports non-keyboard inputs.

Disclosed herein are certain embodiments of a button mapping system and method (collectively, button mapping system) implemented in a Blu-ray Disc (BD) video playback system. For instance, in one embodiment, a button mapping system provides a mechanism to support non-keyboard (e.g., a computer mouse) events in cooperation with a Blu-ray Disc Java (BD-J) menu by detecting buttons in the menu for a given BD-J video presentation (e.g., movie) and generating button information. The button information enables support for user interaction with the menu via a mouse or other non-keyboard input device. Herein, buttons refer to button icons presented on a screen display through a graphical user interface, and hence buttons and button icons are used interchangeably throughout.

Digressing briefly, Blu-ray Disc is one example of an optical storage media format that is employed for storage and/or playback of high definition video. In conjunction with the storage and/or playback of high definition video, a content author may provide one or more user interactive programs containing user interactive features such as menus, widgets or other user interface elements that are executable by a BD player device or BD player software. Such user interactive features allow a user to interact with software residing on a BD disc and executed by a BD playback apparatus (e.g., BD player) to enhance the viewing experience.

However, high definition optical media formats such as the BD format may not require a content author to provide support for various types of input devices that a user may wish to use for interacting with a user interface. As a non-limiting example, a content author may provide support in a user interactive program defining a user interface for a keyboard or remote control input device, but fail to provide support in the user interface for a non-keyboard input device, such as a mouse or pointing device. Consequently, due to a content author's failure to provide a user interactive program supporting a mouse or pointing device, a user may be unable to interact with such a user interface by using a mouse or pointing device (or other non-keyboard device).

Explaining further, although content authors may enable a user to select menu buttons via mouse clicking in some high definition video implementations (e.g., DVD software players), such functionality for BD-J content in BD players is not always present. Hence, in such instances, mouse support for a BD-J menu requires the content application's implementation. However, such functionality is difficult in a BD player because there is no direct way for the player software to acquire the button information from the BD-J application. The BD-J application draws the graphics directly but does not expose the information for each graphic component. Since the BD player cannot identify whether a graphic component is the background or the button, there is presently no BD software player available to support mouse clicks in a BD-J menu where the content author has not made such functionality available.

To address these shortcomings, one or more embodiments of a button mapping system implements a programming sequence that includes internally generating (e.g., without requiring an explicit user prompt) a keyboard event, retrieving an image (e.g., of a BD-J menu screen) before and after the keyboard event, comparing the images, and detecting certain button information. For instance, button information may include button coordinate positions (e.g., x, y, coordinates), the presence of a highlighted button, and/or neighborhood (e.g., neighboring) information (e.g., presence of other buttons, and their respective positions and/or other features, adjacent to a given button). In some embodiments, the button mapping system may repeat (e.g., depending on the quantity of buttons) the generating, retrieving, comparing, and detecting operations to generate a button map, and use the button map to translate mouse clicks into one or more keyboard events recognizable by the BD player to select a button in a BD-J menu.

Accordingly, the present disclosure includes systems and methods for enabling a user to interact with a BD-J menu with non-keyboard devices. For instance, certain embodiments of the disclosed systems and methods provide a BD video playback system that can translate a non-keyboard user input into one or more keyboard events when conducting playback of high definition video such as that on a Blu-ray disc. Consequently, if a Blu-ray disc provides a user interactive program defining a user interface that fails to support user input via a mouse, pointing device, or other non-keyboard input device, the disclosed button mapping systems can translate mouse, pointing device or other non-keyboard input into at least one keyboard event that can be processed by the user interface, thereby enabling a user to interact with such a user interface in additional ways other than those supported by the software residing on the Blu-ray disc. Although described in the context of BD-J menus, other high definition video (or audio) user interfaces with shortcomings similar to those described herein may likewise benefit from certain embodiments of the button mapping systems described herein, and hence are contemplated to be within the scope of the present disclosure.

Reference is now made to FIG. 1, which depicts an embodiment of a BD video playback system 100. In one embodiment, the BD video playback system 100 may comprise a button mapping system, though some embodiments of button mapping systems may comprise a subset of the components of the system 100 or additional components. As illustrated in the non-limiting example of FIG. 1, the BD video playback system 100 may include a playback apparatus 102 coupled to one or more user input devices such as a keyboard, mouse 104, and/or other pointing device(s). The BD video playback system 100 may also include a display 106 (e.g., externally coupled to, or integrated within, the playback apparatus 102). The playback apparatus 102 includes a BD disc viewer 108 capable of reading and/or decoding data stored within a high definition video disc 110. The BD video playback system 100 may include any type of computer system configured to receive input from a user such as a personal computer, a laptop, a digital home television, a set-top box, a mobile phone, a personal digital assistant (PDA), a dedicated playback device, or a combination of two or more of these or other devices.

User interactive content may be received by the BD video playback system 100 via the disc viewer 108 from the Blu-ray disc 110 that comprises an optical storage medium. Alternatively, the system 100 can receive user interactive content from other sources, including, but not limited to, internal mass storage, a local area network, wide area network such as the Internet, cable television service, over-the-air television service, satellite television service, or other content sources as should be appreciated. The system 100 can render (e.g., on a display) user interactive content and high definition video sources via the disc viewer 108, which can execute and/or display to a user (via the display 106) a graphical user interface presented therein.

The disc viewer 108 can be implemented as a software program configured to read and play back content on the disc 110 (or from other high definition video source) according to the specifications defined by standards such as the Blu-ray Disc format specification and the BD-J platform. The disc viewer 108 can also be implemented as a software program residing in the memory, mass storage, the disc 110, a network location, or other locations, as should be appreciated by one having ordinary skill in the art.

In operation, once the disc 110 or other video source is received by the disc viewer 108, the disc viewer 108 can execute and/or render one or more user interactive programs residing on the disc 110. Such a user interactive program can include, but is not limited to, a movie introductory menu or other menus and user interactive features allowing a user to enhance, configure, and/or alter the viewing experience, choose playback configuration options, select chapters to view within the disc 110, in-movie user interactive features, games, or other features as should be appreciated by one having ordinary skill in the art.

Figure 2:
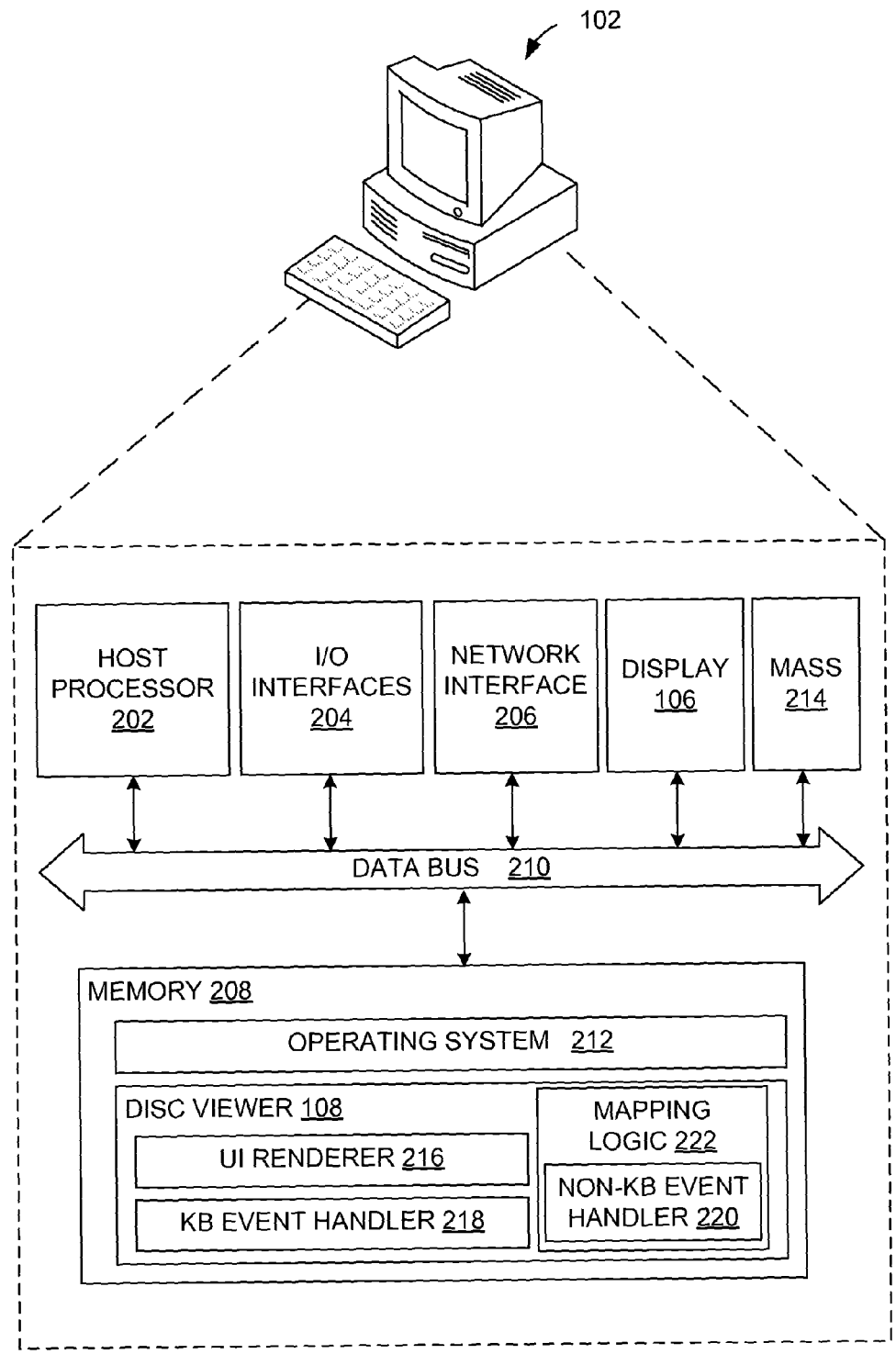
FIG. 2 is a block diagram of an example embodiment of a video playback apparatus configured with mapping logic that enables non-keyboard inputs for BD Java (BD-J) menus.

Reference is now made to FIG. 2, which is an example embodiment of a playback apparatus 102 of the BD video playback system 100. For some embodiments, the playback apparatus 102 may be embodied as some type of computing device, such as the computer shown in FIG. 2. One embodiment of the playback apparatus 102 comprises, among other components, a processing device(s) 202 (e.g., host processor), input/output interface(s) 204, a network interface(s) 206, memory 208, mass storage 214, and the display 106 connected across a data bus 210. One of ordinary skill in the art will appreciate that the playback apparatus 102 may, and typically will, comprise other components, which have been omitted for purposes of brevity.

The display 106 may comprise a computer monitor or a plasma screen for a computer (e.g., personal computer or PC) or a liquid crystal display (LCD), for example.

The playback apparatus 102 may further comprise the mass storage 214, which may be embodied as, for example, a disk drive (e.g., optical and/or magnetic), flash memory, or any other of a wide variety of storage devices capable of storing data.

The processing device 202 can include a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the playback apparatus 102.

Input/output interfaces 204 comprise any number of interfaces for the input and output of data. For example, where the playback apparatus 102 is embodied as a personal computer, such as depicted illustratively in FIG. 2, the components within the playback apparatus 102 may interface with a user input device such as a keyboard, a mouse, or a remote controller. The playback apparatus 102 may also include a network interface 206 for transmitting and/or receiving data over a network such as video content. As a non-limiting example, the network interface 206 may include a modulator/demodulator (e.g., a modem), wireless (e.g., radio frequency (RF)) transceiver, a telephonic interface, a bridge, a router, network card, etc.

The memory 208 may include any one of a combination of volatile memory elements (e.g., random-access memory RAM, such as DRAM, and SRAM, etc.) and nonvolatile memory elements (e.g., ROM, hard drive, tape, CDROM, etc.). The memory 208 may store a native operating system 212, one or more native applications, emulation systems, or emulated applications for any of a variety of operating systems and/or emulated hardware platforms, emulated operating systems, etc. For example, the applications may include the disc viewer 108. One of ordinary skill in the art will appreciate that the memory 208 may, and typically will, comprise other components, which have been omitted for purposes of brevity.

The disc viewer 108 shown in FIG. 2 may be a high definition video software player application used for playing various disc formats such as HD-DVD, Blu-ray discs, as well as video retrieved from the mass storage 214. As noted in FIG. 2, the disc viewer 108 may include a UI renderer 216, a keyboard (KB) event handler 218, and mapping logic 222 that, in one embodiment, comprises a non-keyboard (non-KB) event handler 220. It should be appreciated that one or more of the functionality of these software modules (e.g., 216, 218, 220, and/or 222) may be combined in fewer modules, or distributed among a greater number of modules in some embodiments. The UI renderer 216 renders a user interface defined by a user interactive program residing within a video source, such as the disc 110. Such a user interface, which may be created by a content author for the disc 110, instructs the disc viewer 108 how to display user interface elements to a user via a display or other means as well as how to handle user input from a user. For example, a user interface defined by a user interactive program can instruct the disc viewer 108 and UI renderer 216 to display a plurality of selectable elements, menus, images, video, and other user interface elements on the display 106. The user interface may also instruct the disc viewer 108 and UI renderer 216 how to navigate and/or select displayed selectable elements, menus, and the like in response to user input from a user.

The disc viewer 108 may also include at least one keyboard event handler 218 configured to handle keyboard input from a user. The keyboard event handler 218 receives and processes a keyboard event, which can be generated, for example, by a user depressing a key or the disc viewer 108 generating (internally) the event based on a translation of a non-keyboard event (as described further below), and causes the disc viewer 108 and UI renderer 216 to effectuate any changes to the rendered user interface that are necessary due to the user input. As a non-limiting example, in a rendered user interface containing selectable user interface elements where the currently selected element is highlighted, the keyboard event handler 218 processes a keyboard event that is triggered and corresponds to a user's depressing of an up, down, left, and/or right arrow on a keyboard and causes the UI renderer 216 to highlight a different selectable user interface element corresponding to the appropriate direction of an arrow key depressed by a user. As an additional non-limiting example, the keyboard event handler 218 can detect and process a keyboard event corresponding to a user's depressing of an enter key on a keyboard and causes a currently highlighted selectable element to be selected. As a result, the UI renderer 216 can render user interface elements corresponding to the user's selection.

The disc viewer 108 also includes mapping logic 222. The mapping logic 222 comprises functionality to retrieve images, generate keyboard events, compare images before and after each respective keyboard event, compute button positions, generate neighborhood information of buttons, detect highlighted and normal buttons, and construct (e.g., generate) a button map (e.g., containing button position, normal and highlighted button attributes, and neighborhood information). The mapping logic 222 also comprises a non-keyboard event handler 220 that is configured to translate non-keyboard input from a user into a keyboard event based on the constructed map and detected cursor (e.g., mouse cursor) position (e.g., relative to another button or an absolute position). Non-keyboard input can originate from a peripheral or input device in communication with the playback apparatus 102 that may include a pointing device that can further include, but is not limited to: a mouse, touch pad, touch screen, motion sensitive input device, gesture sensitive input device, inertial input device, gyroscopic input device, joystick, game controller, or other pointing devices. Non-keyboard input can further originate from a voice activated or other non-keyboard peripheral or user input device. The non-keyboard event handler 220 of the mapping logic 222 translates the mouse clicks into keyboard events to select a button in a BD-J menu, as explained further below.

The non-keyboard event handler 220 of the mapping logic 222 translates non-keyboard input to enable a user to interact with a user interactive program defining a user interface that does not support non-keyboard user input. As noted above, content authors creating content for a Blu-ray disc or other high definition video sources may not define event handlers or other systems and methods necessary to allow a user to interact with a user interface with non-keyboard user input devices. Particularly in the case of a Blu-ray disc, a content author using a BD-J platform may often neglect to support any non-keyboard or non-remote-control user input. Therefore, as a non-limiting example, a user viewing content on a playback apparatus 102 may be unable (i.e., without a button mapping system) to interact with a user interface defined therein using a mouse coupled to the playback apparatus 102 even though a user may find it logical and/or easier to use the mouse to interact with the user interface. Accordingly, the mapping logic 222 of the disc viewer 108 of the BD video playback system 100 can provide such functionality absent support in the user interface defined by a user interactive program in a high definition video source.

When the disc viewer 108 is implemented in software, it should be noted that the application can be stored on a variety of computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The interface may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

Having described an example architecture of a playback apparatus 102 for an example BD playback system 100, attention is directed to FIGS. 3A-3C, which illustrate an example button mapping operation performed by the mapping logic 222. In general, the mapping logic 222 provides functionality for generating a keyboard event, for instance in one embodiment, as a task that is transparent to a user, comparing images generated before and after the keyboard event to generate button information, constructing a map of buttons based on the button information, and translating non-keyboard events (e.g., mouse clicks) into one or more keyboard events based on the constructed map of buttons. Referring to FIG. 3A, shown is an example menu (e.g., BD-J menu, though not limited to BD-J) 302, a highlighted button "A" 304 (the highlighting represented here and in other menus that follow by the bold formatted outline of the box, and in FIG. 3A, the highlighting corresponds to the box labeled "A") and a non-highlighted (e.g., normal) button "B" 306 contained within the menu 302.

At the instance that the buttons 304 and 306 appear, the mapping logic 222 generates keyboard events (e.g., arrow key events, such as those events which normally result from activation of the "left," "right," "up," and/or "down" keys on a keyboard device). In one embodiment, the keyboard events are performed transparently (e.g., unseen by a user, though in some embodiments, this feature may be optional or even omitted in some embodiments), and the mapping logic 222 uses such events for comparison of the images of the BD-J graphic plane rendered (e.g., rendered in a buffer) before and after the respective keyboard event. In other words, the mapping logic 222 retrieves an image of the BD-J menu 302 before the keyboard event (as shown in FIG. 3A), and retrieves an image of the menu 302 after the keyboard event, as shown in FIG. 3B.

Explaining further, and referring again to FIG. 3A, it is observed that button "A" 304 is highlighted. The mapping logic 222 generates a "right" keyboard event, which causes the highlight in this example to switch from button "A" 304 to button "B" 306, the latter highlighted button 306A as illustrated in the menu 302A in FIG. 3B.

Referring to FIG. 3C, the mapping logic 222 now has available two images (e.g., in a buffer 308 in, for instance, memory 208) corresponding to respective menus 302 and 302A. The mapping logic 222 compares the before and after images (i.e., before and after the "right" keyboard event), and determines (e.g., detects) that two regions (e.g., button "A" and button "B") have changed. Each of these regions may be uniquely identified by the mapping logic 222 (e.g., button "A" is designated button #1 and button "B" is designated button #2). The mapping logic 222 computes and/or records certain button information for each identified button, such as the coordinates (e.g., x, y, coordinates). The mapping logic 222 may also determine and/or record additional button information, such as whether the button is highlighted (e.g., by comparing the button in different images based on the coordinates or other heuristics). For instance, the mapping logic 222 may detect certain attributes of highlighted buttons, such as whether the button is larger, higher, or exhibits a brighter color relative to neighboring buttons and/or relative to default highlight button attributes (e.g., default highlighted buttons are typically arranged at the left, though not limited as such). Further information detected and/or determined (and recorded) by the mapping logic 222 includes neighborhood information. For instance, neighboring buttons may be detected by causing movement of the highlight in vertical and horizontal directions relative to a particular button.

Referring again to FIG. 3B, the mapping logic 222 continues to generate the keyboard event "right" (e.g., to the right of button "B") until an image identical to a previous image is detected, which reveals that "right" direction keyboard events have been exhausted (which is the case after button "B" 306A in this simple example). The mapping logic 222 proceeds with the plural operations as described above in another direction (e.g., up or down), and continues in similar manner until the menu buttons are mapped and their attributes recorded. In other words, the result of the button mapping method operations comprises a button map with position, highlight/normal, and neighborhood information for each mapped button.

The mapping logic 222, upon detecting a non-keyboard event (e.g., mouse click), determines the currently highlighted button, the cursor position, and the direction and distance between a target button (e.g., the destination of the mouse icon on the menu) relative to a highlighted button based on the generated button map, and translates the mouse click into one or more keyboard events to select the target button. Note that in some embodiments, the button map, once constructed, is shareable among other input devices, and hence can be used for other devices (e.g., used for other non-keyboard devices).

FIGS. 4A-6B illustrate some example BD-J menu screens that provide a context for discussion of some example operations of certain embodiments of the BD video playback system 100. It should be appreciated by one having ordinary skill in the art, in the context of the present disclosure, that the amount of screen space occupied by the buttons may be smaller or larger in some embodiments, and hence is used herein for illustrative purposes. Referring to FIG. 4A, shown is a BD-J menu 400A that comprises a highlighted button 402 (a "play" button) and a non-highlighted button 404 (a "set up" button, where the term "set up" may be presented in an opaque or more obscure graphic format) presented on the display 106, as well as a mouse icon 408 which is moveable in a manner corresponding to a mouse (e.g., mouse 104) as manipulated by a user. It should be appreciated that other features may be present in the display 106 in some embodiments, such as navigation or trick-mode buttons. Note that reference is made to a physical mouse, but it should be understood that other equivalent devices are contemplated, including a mouse pad that a user drags his or her finger upon and/or taps to select (e.g., similar to a left-click). Further, note that reference is made to a mouse icon 408, although icons presented on the screen to represent movement and/or activation of any other non-keyboard device may be used. The invocation by the user of menu 400A prompts the mapping logic 222 to perform the (e.g., background) tasks of mapping the buttons of the menu 400A in the manner as described above, recording such button information as button position, highlight location, and neighborhood information.

Assume in this example, the user has determined that he or she wants to select the non-highlighted button 404 ("set up"). Accordingly, and referring to FIG. 4B, the user moves the mouse to cause the mouse icon 408 to move to the right of button 402A (e.g., from the play button) to the target button 404A ("set up" button). The user selects the button 404A, and a selection signal is received corresponding to the received non-keyboard input. Responsively, the mapping logic 222, based on prior or contemporaneous processing that ascertained the neighborhood buttons, highlight and normal attributes, button coordinate positions, and other button information, determines that the target button is to the right of the play button 402A, and hence translates the mouse click into a "right" keyboard event followed by an "enter" keyboard event. The keyboard event sequence (right+enter) results in selection of the set-up button 404A as if the user had at his or her disposal a keyboard based-device (e.g., infrared channel remote) comprising an actual right arrow button and an enter button.

Note that variations of the above-described process are contemplated to be within the scope of the disclosure. For instance, in one embodiment, described above, in response to moving the mouse icon 408 from the highlighted play button 402 to the set up button 404 and clicking the mouse, the set up button 404A is highlighted and the non-keyboard event (e.g., mouse click) is translated into a keyboard sequence of right plus enter. In other words, simply moving the mouse icon 408 does not change the highlight of the play button (i.e., the set-up button 404 is not highlighted, or a keyboard event is not generated, merely by overlaying the mouse icon 408 over the set up button 404). In some embodiments, the movement of the mouse icon 408 over the set up button 404 causes the highlight to move from the play button 402 to the set up button 404A (e.g., translated to a right keyboard event), and the selection (e.g., clicking) of the mouse on the set up button 404A translates to another keyboard event (i.e., enter).

Figure 5B:
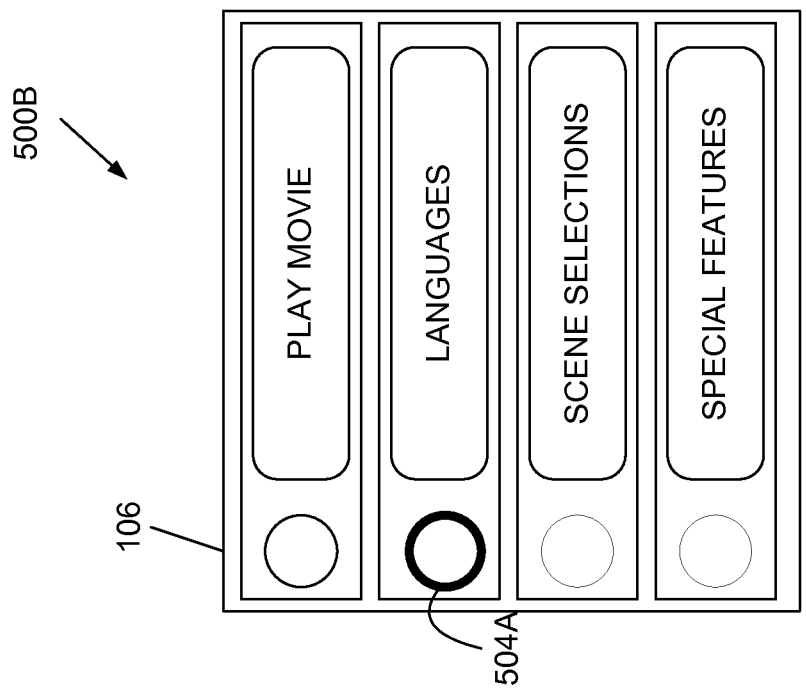
FIGS. 5A-5B are example menu screens illustrating an embodiment of a method for detecting button information based on color comparisons between two images.
Figure 5A:
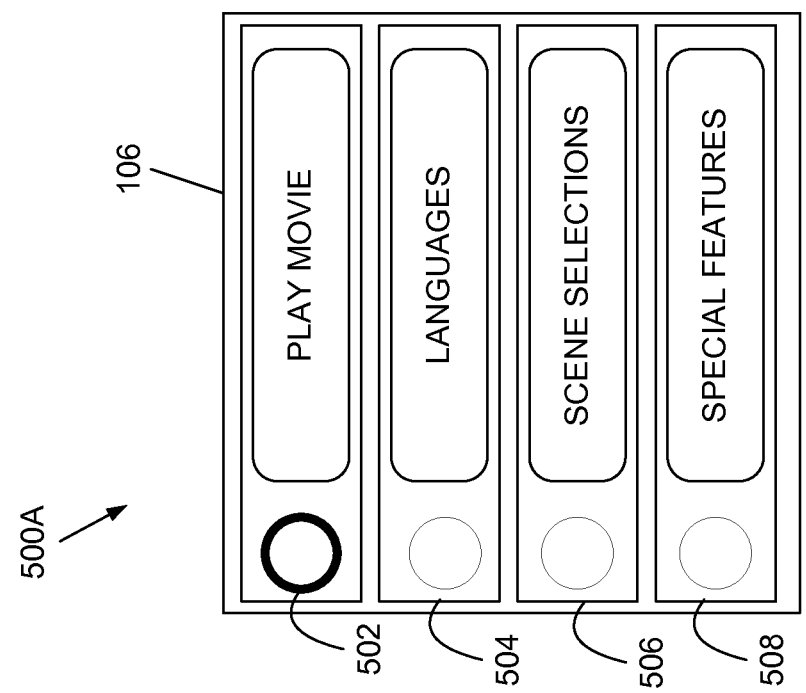

Referring to FIGS. 5A and 5B, shown are other example BD-J menus 500A and 500B (collectively, menu 500) presented on the display 106. In this example menu 500, the mapping logic 222 generates a button map based on the relative vertical position of the color-highlight button 502. For instance, the color highlight button 502 (e.g., a green lit, round button, though not limited in terms of color or geometric configuration of the button) may correspond to a "play movie" selection in FIG. 5A (as compared to non-color-highlighted buttons 504 ("languages"), 506 ("scene selections"), and 508 ("special features"). In FIG. 5B, the color-highlighted button 504A is depicted as corresponding to languages. The mapping logic 222, during the button mapping process, determines the color-highlight position, as well as neighborhood information that, in this example of FIGS. 5A-5B, is entirely in the vertical direction.

Figure 6B:
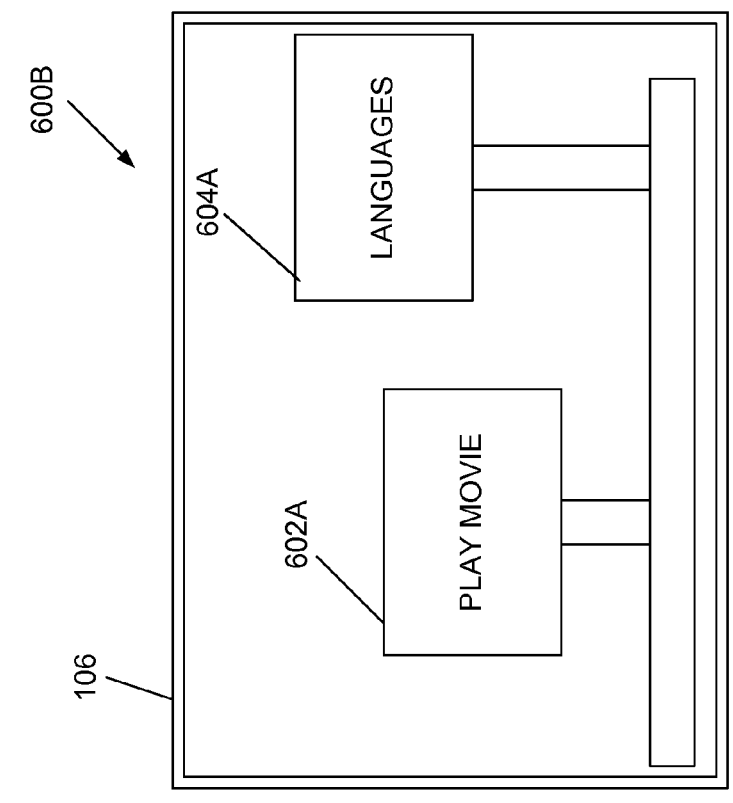
FIGS. 6A-6B are example menu screens illustrating an embodiment of a method for detecting differences in orientation of menu features.
Figure 6A:
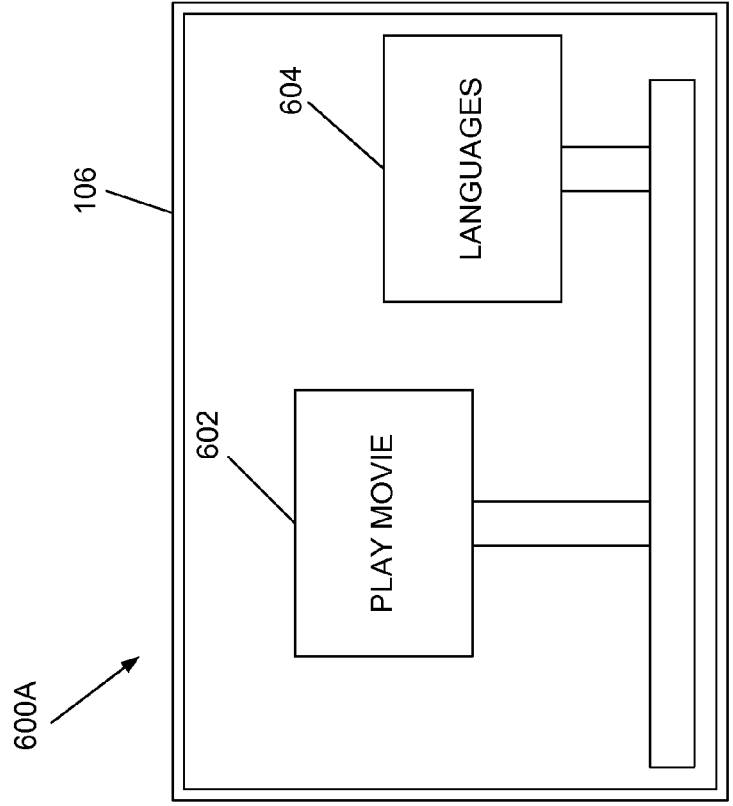

FIG. 6A provides another illustrative example of a BD-J menu 600A (and 600B in FIG. 6B, collectively 600A and 600B referred to also as merely menu 600) presented on the display 106. In this example, the menu 600 draws a detected distinction from the mapping logic 222 by virtue of the relative vertical positions of the menu selections 602 and 604. Note that in some embodiments, the menu selections 602 and 604 may be oriented differently (e.g., not exactly straight up and down, but rather, angled to the left or right) with similar effect. In FIG. 6A, the "play movie" button 602 is in the form of a placard icon that is positioned higher (representing an alternative to a highlighted button) relative to the "languages" button 604. In FIG. 6B, the menu 600B comprises the languages button 604A in the higher vertical position relative to the play movie button 602A, and hence represents the highlighted position. In some embodiments, it should be appreciated that one or more of these various menu features may be combined. For instance, the vertical position distinctions in menus 600 may be further bolstered by a difference in highlighting as well.

Having provided a detailed description of certain embodiments of BD video playback systems 100, it should be appreciated that one button mapping method embodiment 100A, implemented by the playback apparatus 102 and illustrated in FIG. 7, comprises retrieving a first image, the first image including a first version of buttons in a menu (702). For instance, the first version may correspond to the visual appearance (e.g., highlighting, relative positioning of the buttons, color) of the buttons. In (704), a keyboard event is internally generated (704). That is, in some embodiments, the user may not need to provoke or invoke the keyboard event, and the keyboard event may be implemented in a manner that is transparent to the user (though not limited as such). Referring to (706), the playback apparatus 102 retrieves a second image responsive to the keyboard event, the second image including a second version of the buttons. In other words, the second version of the buttons may reflect a change in highlight (e.g., from one button to another when considered in the context of the first version), color, and/or position. In (708), the playback apparatus 102 compares an image difference between the first and second images, and constructs a button map based on the comparison (710). The button map may include button information for at least two buttons in the menu. The playback apparatus 102 receives one or more selection signals corresponding to one or more non-keyboard events (e.g., mouse clicks, or other non-keyboard device input) (712), and translates the one or more selection signals into one or more keyboard events based on the button map, wherein at least one of the two buttons is selected based on the translation (714).

Figure 8:
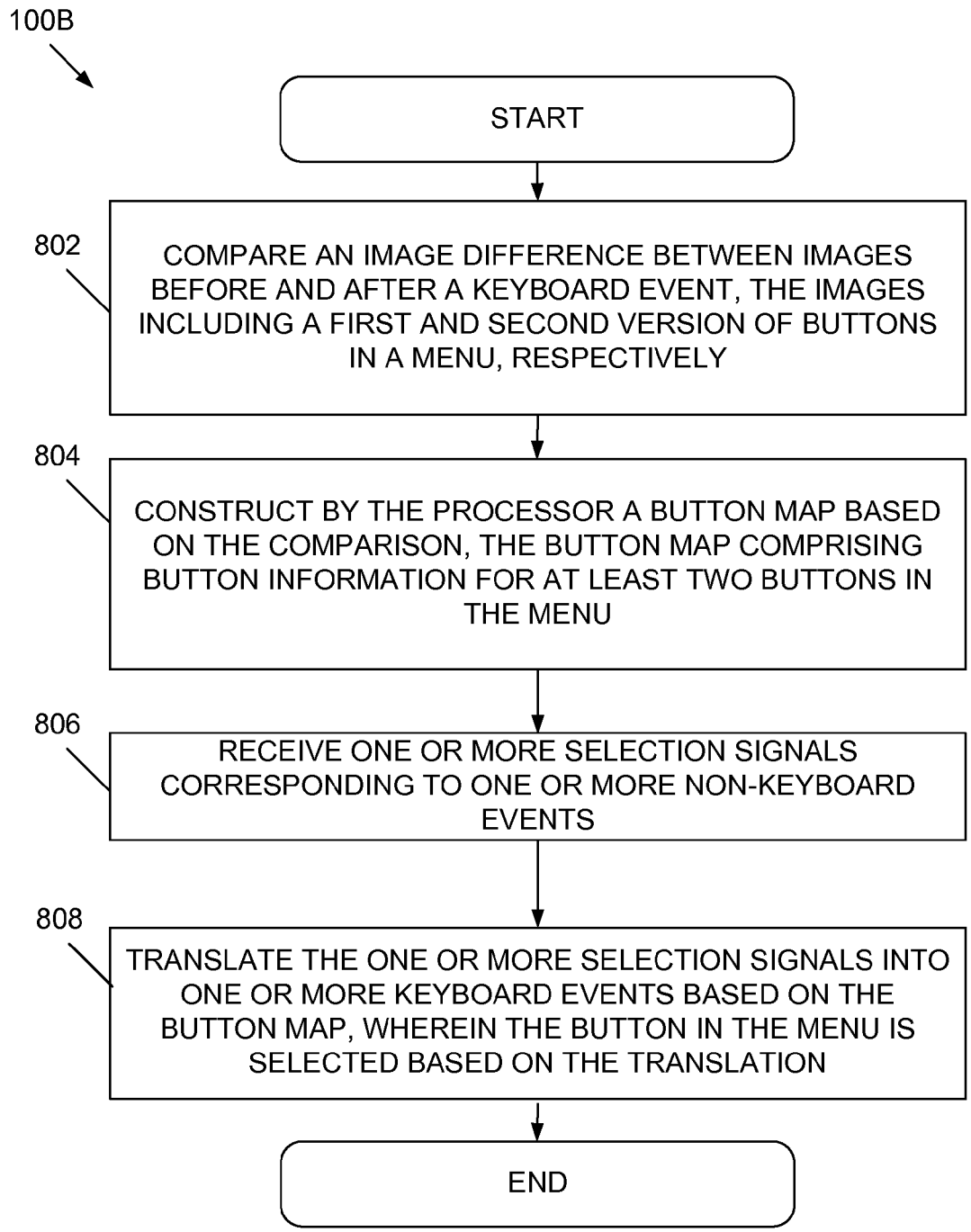
FIG. 8 is a flow diagram of an embodiment of a button mapping method implemented in a BD video playback system.

In view of the above disclosure, it should be appreciated that another button mapping method 1008, implemented by a processor (e.g., processor 202) and illustrated in FIG. 8, comprises comparing an image difference between images before and after a keyboard event, the images including a first and second version of buttons in a menu, respectively (802). For instance, the first and second versions may vary according to highlighting, color, positioning, etc. The processor constructs a button map based on the comparison (804). The button map may include button information for at least two buttons in the menu. In (806), one or more selection signals corresponding to one or more non-keyboard events (e.g., mouse clicks) are received. The processor translates the one or more selection signals into one or more keyboard events based on the button map, wherein the button in the menu is selected based on the translation (808).

Any process descriptions or blocks in flow diagrams should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present invention. Also, though certain architectures are illustrated in the present disclosure, it should be appreciated that the methods described herein are not necessarily limited to the disclosed architectures.

In addition, though various delineations in software logic have been depicted in the accompanying figures and described in the present disclosure, it should be appreciated that one or more of the functions performed by the various logic described herein may be combined into fewer software modules and or distributed among a greater number. Further, though certain disclosed benefits/advantages inure to certain embodiments of button mapping systems, it should be understood that not every embodiment necessarily provides every benefit/advantage.

In addition, the scope of the certain embodiments of the present disclosure includes embodying the functionality of certain embodiments of button mapping systems in logic embodied in hardware or software-configured mediums.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A button mapping method comprising:
   retrieving a first image, the first image including a first version of buttons in a disc menu;
   internally generating a keyboard event without user interaction;
   retrieving a second image responsive to the keyboard event, the second image including a second version of the buttons;
   comparing an image difference between the first and second images;
   constructing a button map based on the comparison, the button map comprising button information for at least two buttons in the disc menu, wherein the button information comprises positioning information of the at least two buttons, button highlighting attributes, and positioning information of neighboring objects with respect to the at least two buttons;
   receiving one or more selection signals corresponding to one or more non-keyboard events for selecting a button from the disc menu; and
   translating the one or more selection signals into one or more keyboard events based on the button map, wherein translating comprises determining a position of a currently highlighted button and determining a cursor position and a cursor direction of a displayed cursor relative to the currently highlighted button position, and wherein at least one of the two buttons in the disc menu is selected based on the translation.

2. The method of claim 1, wherein receiving the selection signal comprises receiving a signal based on a mouse click.

3. The method of claim 1, wherein receiving and translating comprises either a first sequence or a second sequence,
   wherein the first sequence comprises receiving a first non-keyboard input corresponding to movement of an icon from a first button to a second button and receiving a second non-keyboard input corresponding to selection with the icon, the first non-keyboard event translated to a highlighting of the second button and the second non-keyboard event corresponding to an enter operation;
   wherein the second sequence comprises receiving a third non-keyboard input corresponding to movement of the icon from the first button to the second button and receiving a fourth non-keyboard input corresponding to selection with the icon, the third and fourth non-keyboard events translated to a highlighting and enter operation associated with the second button.

4. The method of claim 1, wherein generating the button map comprises determining a button position responsive to the comparing.

5. The method of claim 1, wherein generating the button map comprises determining a highlighted button responsive to the comparing.

6. The method of claim 1, further comprising repeating the retrieving, generating, retrieving, and comparing for keyboard events in the same and different directions of the disc menu until all possible buttons are mapped.

7. A button mapping system, comprising:
   a memory comprising disc viewer logic encoded thereon; and
   a processor configured to:
      internally generate a keyboard event without user interaction;
      compare an image difference between images before and after the keyboard event, the images including a first and second version of buttons in a disc menu, respectively;
      construct a button map based on the comparison, the button map comprising button information for at least two buttons in the disc menu, wherein the button information comprises positioning information of the at least two buttons, button highlighting attributes, and positioning information of neighboring objects with respect to the at least two buttons;
      receive one or more selection signals corresponding to one or more non-keyboard events; and
      translate the one or more selection signals into one or more keyboard events based on the button map, wherein translating comprises determining a position of a currently highlighted button and determining a cursor position and a cursor direction relative to the currently highlighted button position, and wherein the button in the disc menu is selected based on the translation.

8. The system of claim 7, wherein the processor is further configured by the disc viewer logic to retrieve a first image immediately before the keyboard event, retrieve a second image immediately after the keyboard event, and perform the comparison based on the first and second images.

9. The system of claim 7, wherein the processor is further configured by the disc viewer logic to construct the button map by determining a button position responsive to the comparison.

10. The system of claim 7, wherein the processor is further configured by the disc viewer logic to construct the button map by determining a highlighted button responsive to the comparison.

11. The system of claim 7, wherein the processor is further configured by the disc viewer logic to translate by determining a currently highlighted button position and determining a cursor position and direction relative to the currently highlighted button position.

12. The system of claim 7, wherein the processor is further configured by the disc viewer logic to repeat retrieving a before image, generating the keyboard event without user interaction, retrieving an after image, and comparing for the respective keyboard event in the same and different directions of the disc menu until all possible buttons are mapped.

13. A button mapping method implemented by a processor, the method comprising:
- internally generating a keyboard event without user interaction;
- comparing an image difference between images before and after the keyboard event, the images including a first and second version of buttons in a disc menu, respectively;
- constructing by the processor a button map based on the comparison, the button map comprising button information for at least two buttons in the disc menu, wherein the button information comprises positioning information of the at least two buttons, button highlighting attributes, and positioning information of neighboring objects with respect to the at least two buttons;
- receiving one or more selection signals corresponding to one or more non-keyboard events; and
- translating the one or more selection signals into one or more keyboard events based on the button map, wherein translating comprises determining a position of a currently highlighted button and determining a cursor position and a cursor direction relative to the currently highlighted button position, and wherein the button in the disc menu is selected based on the translation.

14. The method of claim 13, further comprising retrieving a first image immediately before the keyboard event, retrieve a second image immediately after the keyboard event, and comparing based on the first and second images.

15. The method of claim 13, wherein constructing the button map comprises determining a button position responsive to the comparing.

16. The method of claim 13, wherein constructing the button map comprises determining a highlighted button responsive to the comparing.

17. The method of claim 1, wherein the keyboard event corresponds to activation of one of: a left key, a right key, an up key, and a down key of a keyboard device.

18. The method of claim 1, wherein the first version and the second version of the buttons differ according to at least one of: highlighting, relative positioning of the buttons, and color.

19. The method of claim 1, wherein the received one or more selection signals comprise user input, and
- wherein the steps of retrieving the first image, internally generating the keyboard event, retrieving the second image, comparing the image difference between the first and second images, and constructing the button map based on the comparison are performed prior to receiving the user input.

* * * * *